J. Busser.
Vibrating Propeller.

Nº 66,214. Patented Jul. 2, 1867.

Witnesses.

Inventor.

United States Patent Office.

JACOB BUSSER, OF PHILADELPHIA, PENNSYLVANIA.

Letters Patent No. 66,214, dated July 2, 1867.

IMPROVED SHIFTING-BUCKET PROPELLER.

The Schedule referred to in these Letters Patent and making part of the same.

TO ALL WHOM IT MAY CONCERN:

Be it known that I, JACOB BUSSER, of the city of Philadelphia, and State of Pennsylvania, have invented certain new and useful Improvements in Shifting-Bucket Propellers; and I do hereby declare the following to be a full, clear, and exact description of the same, reference being had to the accompanying drawings, making a part of this specification, in which—

Similar letters of reference, where they occur in the separate figures, denote like parts in both of the drawings.

My invention consists in an arrangement of hinged or pivoted buckets with a reversing lever and frame, so that without stopping or reversing the engine the propeller may be made to move forward or back the boat at the will of the operator or attendant.

To enable others skilled in the art to make and use my invention, I will proceed to describe the same in connection with the drawings.

Figure 1:
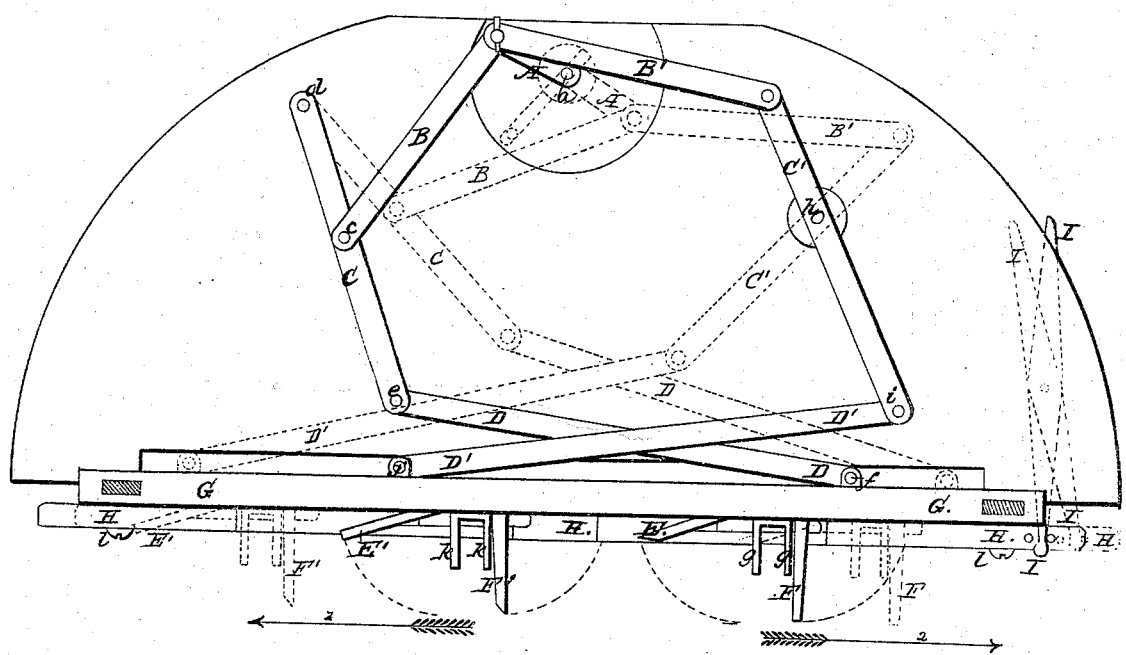
Figure 1 represents the buckets and mechanism for working them in one position by black lines, and in another position by red lines.
Figure 2:
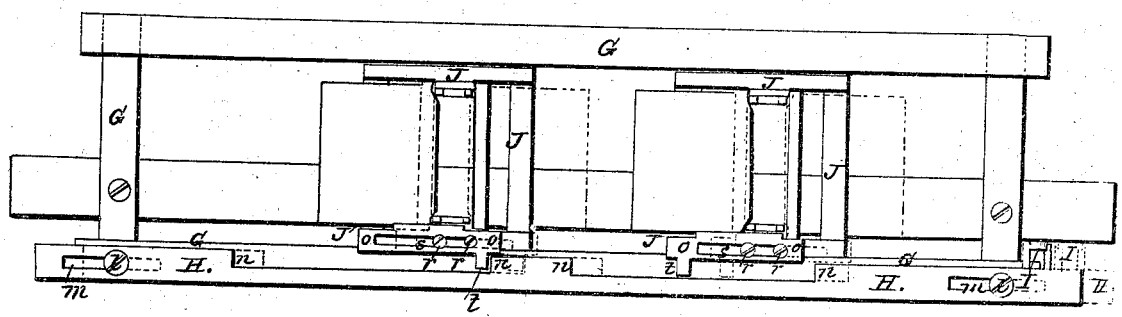
Figure 2 represents an edge or under view of the buckets, with the frame by which they are thrown into or out of action, or have their propelling action reversed.

$a$ represents the main driving-shaft of the propeller, which may have a continuous motion in one direction only. Upon this shaft or journal $a$ there is placed a crank-arm, A, to which the two levers B B' are attached. The lever or connecting-rod or bar B is pivoted at or near the centre of a pivoted lever, C, as at $c$, said lever C being pivoted at one of its ends, $d$, to the boat, or other permanent part thereof. To the other or free end of the lever C, as at $e$, one end of a connecting-rod or bar, D, is pivoted, the other end being pivoted, as at $f$, to a lug on the frame that carries the two buckets E F and their brace or supports $g$ between them. The frame that carries the buckets through the system of connecting-rods, levers, and crank, is thus reciprocated back and forth on the main supporting frame G. The other lever-rod or bar B', extending in an opposite direction from its mate or fellow B, is pivoted to the end of a lever, $c'$, which, in turn, is pivoted near its centre, as at $h$, and to the other or lower end of this lever $e'$ is pivoted, as at $i$, a connecting-rod or bar, D', the other end of which is pivoted at $j$ to a lug on a second pair of buckets, E' F', on a frame that reciprocates on the main frame G, said second pair of buckets having their supports or stops $k$ $k$ between them, as in the case of the first-described buckets. Underneath the main propeller frame G, and secured to it by screws $l$ $l$, passing through slots $m$ $m$, so that it may be moved to the extent of the slots, if necessary, is a shifting-bar, H, with recesses formed therein, so as to make shoulders, $n$ $n$ $n$ $n$, upon it. This shifting-bar is moved by a lever, I, into two different positions, as shown by the red and by the black lines in the figures, and as it is moved one or the other of the pairs of shoulders $n$, as the case may be, moves a sliding-piece, $o$, on each of the bucket-frames J, which sliding-piece in being moved lets down or into action one pair of buckets and at the same time raises up or throws out of action the other pair of buckets. Now, by the same continued motion of the bucket-frames, these separate pairs of buckets act in precisely contrary direction, one of the pairs when let down tending to force the boat forward, while the other pair when let down and the first pair raised up will tend to back the boat, so that without stopping the engine or reversing the propeller-shaft, but simply by shifting the lever I from one of its stops to the other, the propulsion is forward or backward, as the case may be. The sliding-pieces $o$ $o$ are connected to the bucket-frames J by screws $r$, passing through slots $s$, so that while ordinarily moving with the buckets or their frame they may be moved independent of it for the purpose of throwing one set of the buckets out of and the other set into action by the same operation, and which is accomplished by the shoulders $n$ on the shifting-bar H coming against the projections $t$ on the sliding-pieces $o$. When the parts are in the position shown by the black lines, or when the lever J is in the position shown by the black lines the buckets E and E' are raised up out of action, having been swung up by the sliding-pieces $o$ moved against them by the shifting-bar H. In this position the buckets F and F' are in action, and the propulsion of the boat or vessel will be in the direction of the arrow 1. When the lever J is moved to its other position, as shown by the red dotted lines in fig. 1, then the buckets F and F' are thrown out of and the others, E E', brought into action, and the propulsion will then be in the direction of the arrow 2, and that, too, while the power has neither been stopped or the direction of the motion changed. The motions of the pairs of buckets, when in action, are simultaneous, or nearly so, toward and then from each other. When approaching each other, one of the pairs is propelling and the other one swung up on its hinged connection by the resistance of the water; when they recede from each other the before passive one of the pair becomes active, and *vice versa*, so that one bucket is always propelling; and this series of buckets may be duplicated or extended at pleasure.

Having thus fully described my invention and the manner in which it is operated, what I claim therein as new, and desire to secure by Letters Patent, is—

In combination with the pairs of hinged buckets, the shifting-bar and slides, so that by means of a lever the propulsion may be forward or backward without stopping or reversing the engine or changing the direction of motion of the crank-shaft, substantially as described.

JACOB BUSSER.

Witnesses:
   DAVID BEISLER,
   LEMUEL T. SELBY.